(12) United States Patent  
Sagisaka et al.

(10) Patent No.: US 11,749,805 B2  
(45) Date of Patent: Sep. 5, 2023

(54) LIQUID COMPOSITION FOR FORMING ELECTROCHEMICAL DEVICE, METHOD OF MANUFACTURING ELECTRODES, METHOD OF MANUFACTURING ELECTROCHEMICAL DEVICE AND ELECTRODES

(71) Applicant: RICOH COMPANY, LTD., Tokyo (JP)

(72) Inventors: Toshiya Sagisaka, Kanagawa (JP); Hiromichi Kuriyama, Kanagawa (JP); Satoshi Nakajima, Tokyo (JP); Porraphon Tantitarntong, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 44 days.

(21) Appl. No.: 17/158,202

(22) Filed: Jan. 26, 2021

(65) Prior Publication Data

US 2021/0234171 A1    Jul. 29, 2021

(30) Foreign Application Priority Data

Jan. 28, 2020  (JP) ................................ 2020-011865  
Dec. 1, 2020   (JP) ................................ 2020-199658

(51) Int. Cl.
| | |
|---|---|
| H01M 4/58 | (2010.01) |
| H01M 4/62 | (2006.01) |
| H01M 4/525 | (2010.01) |
| H01M 10/0525 | (2010.01) |
| H01M 4/1397 | (2010.01) |
| H01M 4/1391 | (2010.01) |
| H01M 4/04 | (2006.01) |
| H01M 4/505 | (2010.01) |

(52) U.S. Cl.  
CPC ......... *H01M 4/622* (2013.01); *H01M 4/0416* (2013.01); *H01M 4/1391* (2013.01); *H01M 4/1397* (2013.01); *H01M 4/505* (2013.01); *H01M 4/525* (2013.01); *H01M 4/5825* (2013.01); *H01M 4/625* (2013.01); *H01M 10/0525* (2013.01)

(58) Field of Classification Search  
CPC .................................................. H01M 4/622  
See application file for complete search history.

(56) References Cited

U.S. PATENT DOCUMENTS

| | | | |
|---|---|---|---|
| 10,090,554 | B2 | 10/2018 | Yanagita et al. |
| 2010/0099026 | A1 | 4/2010 | Choi et al. |
| 2016/0260972 | A1 | 9/2016 | Hibino et al. |
| 2017/0040612 | A1* | 2/2017 | Komaba ............... H01M 4/386 |
| 2018/0097235 | A1* | 4/2018 | Yang ..................... H01M 4/622 |
| 2019/0382530 | A1* | 12/2019 | Saito ....................... C08L 79/08 |
| 2020/0083542 | A1* | 3/2020 | Yushin ................. H01M 4/8828 |
| 2020/0194797 | A1* | 6/2020 | Kim ..................... H01M 4/622 |
| 2020/0208028 | A1* | 7/2020 | Kakutaka ................. C09D 7/69 |
| 2020/0220160 | A1 | 7/2020 | Nakajima et al. |
| 2020/0235375 | A1 | 7/2020 | Nakajima et al. |
| 2020/0295355 | A1 | 9/2020 | Kanno et al. |
| 2021/0005876 | A1 | 1/2021 | Hibino et al. |
| 2021/0380745 | A1* | 12/2021 | Commarieu ......... C08G 63/912 |
| 2022/0311005 | A1* | 9/2022 | Biso ....................... H01M 4/622 |

FOREIGN PATENT DOCUMENTS

| | | |
|---|---|---|
| JP | 2012-150921 | 8/2012 |
| JP | 5891974 | 3/2016 |
| JP | 2016-170891 | 9/2016 |
| JP | 2016-177910 | 10/2016 |
| JP | 2017-188283 | 10/2017 |
| JP | 2017-188284 | 10/2017 |
| JP | 6329862 | 5/2018 |
| JP | 6536701 | 7/2019 |
| JP | 2019-164993 | 9/2019 |
| WO | 2010-097946 | 4/2010 |
| WO | 2017/138537 | 8/2017 |

* cited by examiner

*Primary Examiner* — Austin Murata  
(74) *Attorney, Agent, or Firm* — Grüneberg and Myers, PLLC

(57) ABSTRACT

The present invention relates to a liquid composition for forming an electrochemical device contains one or both of an active material or an electrolyte;

a dispersion medium; and a polymer, wherein the polymer contains constituent units having one or both of an amide bond or an imide bond, and having a group represented by a following general formula (I):

$$\sim O \left( \left( \begin{array}{c} R^3 \quad R^4 \\ \\ R^1 \quad R^2 \end{array} \right)_m X \right)_n \quad (I)$$

wherein X is an oxygen atom, or a carbon atom substituted with a hydrogen atom or an alkyl group, wherein $R^1$, $R^2$, $R^3$, and $R^4$ are each independently hydrogen atoms, substituted or unsubstituted alkyl groups, or substituted or unsubstituted cycloalkyl groups, and m and n are positive integers.

17 Claims, 6 Drawing Sheets

LIQUID COMPOSITION FOR FORMING ELECTROCHEMICAL DEVICE, METHOD OF MANUFACTURING ELECTRODES, METHOD OF MANUFACTURING ELECTROCHEMICAL DEVICE AND ELECTRODES

CROSS-REFERENCE TO RELATED APPLICATIONS

The present application claims priority under 35 U.S.C. § 119 to Japanese Patent Application No. 2020-011865, filed Jan. 28, 2020, and Japanese Patent Application No. 2020-199658, filed Dec. 1, 2020. The contents of which are incorporated herein by reference in their entirety.

BACKGROUND OF THE INVENTION

Field of the Invention

The present invention relates to a liquid composition for forming an electrochemical device, a method of manufacturing electrodes, a method of manufacturing an electrochemical device, and electrodes.

Description of the Related Art

Electrochemical devices such as lithium-ion secondary batteries are used in mobile devices, hybrid cars, electric cars, or the like, and demand for such devices has been increasing. In addition, the need for thin batteries that may be mounted in various types of wearable devices and medical patches have been increasing, and the demands for electrochemical devices have been increasing in various fields.

Conventionally, electrodes constituting electrochemical devices are manufactured by forming an electrode composite material layer on an electrode substrate by applying a liquid composition using a die coater, a comma coater, a reverse roll coater, or the like is known.

A liquid composition generally includes an active material, a dispersion medium and a binder, but the viscosity of the composition at 25° C. is thousands to tens of thousands of mPa·s, because the binder is dissolved in the dispersion medium.

Meanwhile, a method of forming an electrode composite material layer on an electrode substrate using a liquid composition that can be discharged by a liquid discharge method is known (see, for example, Patent Document 1).

The liquid discharge method is a method of discharging fine droplets of a liquid composition from a discharge hole of a liquid discharge head. Examples of the method for discharging droplets of the liquid discharge head include a piezo method, a thermal method, a valve method, and the like. In the piezo method, the discharge amount of the liquid composition can be accurately controlled by controlling a voltage, and heat is not used in this method. Therefore, the impact on the use environment is small and the durability is high.

RELATED-ART DOCUMENT

Patent Documents

Patent Document 1: Japanese Patent Application Laid-Open No. 2010-97946

SUMMARY OF THE INVENTION

Problems to be Solved by the Invention

Liquid compositions that can be discharged by the liquid discharge method generally have a viscosity of from a few to several hundred mPa·s at 25° C. in view of storage stability and discharge stability, so that the viscosity must be less than the viscosity at 25° C. of conventional liquid compositions. In particular, when a piezo-type liquid discharge head is used, it is necessary to adjust the viscosity and surface tension of the liquid composition to an appropriate value in order to improve discharge stability.

To reduce the viscosity of the liquid composition, it is considered that a binder content may be reduced.

However, a fixed amount of binder must be added to an active material, because the binder is added to bind the active material to the electrode substrate and bind the active material each other. In addition, in order to obtain the liquid composition that can be discharged by the liquid discharge method, it is also important to freely select materials such as a dispersion medium and the like from the viewpoint of reducing an environmental load and optimizing the process.

One aspect of the invention is to provide a liquid composition for forming an electrochemical device with excellent storage stability and discharge stability.

Means for Solving the Problems

One aspect of a liquid composition for forming an electrochemical device according to the present invention includes one or both of an active material or an electrolyte; a dispersion medium; and a polymer, wherein the polymer contains constituent units having one or both of an amide bond or an imide bond, and having a group represented by a following general formula (I):

[Chemical Formula 1]

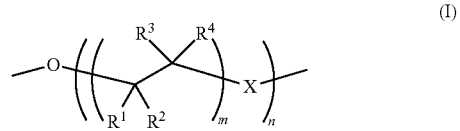

wherein X is an oxygen atom, or a carbon atom substituted with a hydrogen atom or an alkyl group, wherein $R^1$, $R^2$, $R^3$, and $R^4$ are each independently hydrogen atoms, substituted or unsubstituted alkyl groups, or substituted or unsubstituted cycloalkyl groups, and m and n are positive integers.

Effects of the Invention

According to an aspect of the present invention, a liquid composition for forming an electrochemical device with excellent storage stability and discharge stability can be provided.

DESCRIPTION OF THE EMBODIMENTS

Figure 1:
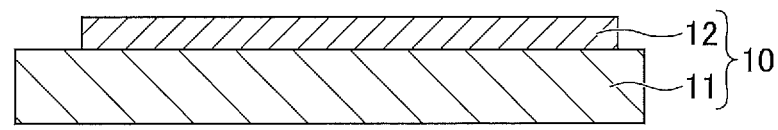
FIG. 1 is a cross-sectional view illustrating an example of a negative-electrode of the present embodiment.

Hereinafter, embodiments for carrying out the present invention will be described with reference to the drawings. Explanations of the same configuration may be omitted with the same reference numerals.

<Liquid Composition for Forming Electrochemical Device>

The liquid composition for forming an electrochemical device in the present embodiment includes one or both of an active material or an electrolyte; a dispersion medium; and a polymer. A conductive agent, a dispersant, and the like can be further included as needed. The liquid composition for forming an electrochemical device in the present embodiment preferable includes an active material, a dispersion medium, and a polymer.

The viscosity at 25° C. of the liquid composition for forming an electrochemical device of the present embodiment is preferably 200 mPa·s or less, and more preferably 50 mPa·s or less. When the viscosity at 25° C. of the liquid composition for forming the electrochemical device is 200 mPa·s or less, the discharge stability of the liquid composition for forming the electrochemical device is improved.

The lower limit of viscosity at 25° C. of the liquid composition for forming the electrochemical device of the present embodiment is not particularly limited, but is usually 10 mPa·s.

The liquid composition for forming an electrochemical device of the present embodiment can be prepared by dissolving or dispersing one or both of an active material or an electrolyte, and a polymer in a dispersion medium.

The liquid composition for forming an electrochemical device of the present embodiment can be used to manufacture electrodes of the electrochemical device.

The electrochemical device includes a secondary battery, a capacitor, or the like, but is not particularly limited if the electrochemical device can store electricity.

[Active Material]

As the active material, a positive-electrode active material or a negative-electrode active material which can be applied to the electrochemical device can be used.

The positive-electrode active material is not particularly limited as long as the positive-electrode active material can intercalate and deintercalate an alkali metal ion. An example of the positive-electrode active material includes an alkali metal-containing transition metal compound.

Examples of alkali metal-containing transition metal compounds include a lithium-containing transition metal compound of composite oxide or the like containing lithium and one or more elements selected from the group consisting of cobalt, manganese, nickel, chromium, iron, and vanadium.

Examples of lithium-containing transition metal compounds include lithium cobalt oxide, lithium nickel oxide, lithium manganese oxide, and the like.

As the alkali metal-containing transition metal compound, a polyanionic-based compound having an $XO_4$ tetrahedra (X=P, S, As, Mo, W, Si, or the like) in the crystalline structure may also be used. Among these, lithium-containing transition metal phosphate compounds, such as lithium iron phosphate, lithium vanadium phosphate, and the like, are preferably used from the viewpoint of cycle characteristics, and vanadium lithium phosphate is particularly preferably used from the viewpoint of lithium diffusion coefficient and input-output characteristics of the electrochemical device.

The surface of the polyanionic-based compound is preferably coated with a conductive agent such as a carbon material or the like to form a composite, from the viewpoint of electronic conductivity.

The negative-electrode active material is not particularly limited as long as the negative-electrode active material can intercalate and deintercalate an alkali metal ion. An example of the negative-electrode active material includes a carbon material containing graphite having a graphite-type crystalline structure.

Examples of the carbon materials include natural graphite, artificial graphite, non-graphitizable carbon (hard carbon), graphitizable carbon (soft carbon), and the like.

As negative-electrode active materials other than the above-mentioned carbon materials, lithium titanium oxide, titanium oxide, and the like may be used.

In view of the energy density of the electrochemical device, high-capacity materials such as silicon, tin, silicon alloy, tin alloy, silicon oxide, silicon nitride, tin oxide, and the like can be preferably used as the negative-electrode active material.

When the active material includes lithium, the dispersion medium is preferably a non-aqueous dispersion medium. In this case, the content of water in the liquid composition for forming the electrochemical device of the present embodiment is preferably 5% by mass or less and more preferably 1% by mass or less. When the content of water in the liquid composition for forming the electrochemical device of the present embodiment is 5% by mass or less, lithium contained in the active material reacts with water to form a compound, such as lithium carbonate, and the reduction of the discharge capacity of the electrochemical device can be suppressed. In addition, generation of gas caused by a decomposition of a compound such as lithium carbonate can be suppressed during the charge and discharge of the electrochemical device.

A mode field diameter of the active material is preferably 3 μm or less and further preferably 1 μm or less. When the mode field diameter of the active material is 3 μm or less, the discharge stability and storage stability of the liquid composition for forming the electrochemical device of the present embodiment are improved.

Particle diameter at 10% ($D_{10}$) of the active material is preferably 0.1 μm or more and more preferably 0.15 μm or more. When the particle diameter at 10% ($D_{10}$) of the active material is 0.1 μm or more, the storage stability of the liquid composition used to form the electrochemical device of the present embodiment is improved.

A content of the active material in the liquid composition for forming the electrochemical device of the present embodiment is preferably 10% by mass or more and more preferably 15% by mass or more. When the content of the active material in the liquid composition for forming the electrochemical device of the present embodiment is 10% by mass or more, the number of times required to form the electrode composite material layer in a predetermined amount is reduced.

[Electrolyte]

For an electrolyte, an aqueous electrolyte solution or a non-aqueous electrolyte may be used. As the electrolyte, the electrolyte used in the electrochemical device described below can be used. Details of the electrolytes are described later.

[Dispersion Medium]

A dispersion medium is not particularly limited as long as the dispersion medium is capable of dissolving a polymer and dispersing an active material. Examples of dispersion medium include ethylene glycol, propylene glycol, N-methyl-2-pyrrolidone, cyclohexanone, acetate, mesitylene, 2-n-butoxymethanol, 2-dimethylethanol, N,N-dimethylacetamide, N,N-dimethylformamide, dimethyl sulfoxide, lactic acid ester, tetramethylurea, anisole, dibutyl ether, 1,2-diethoxyethane, and the like. Among these, two or more kinds may be used in combination.

[Polymer]

A polymer contains constituent units having one or both of an amide bond or an imide bond, and having a group represented by a following general formula (I):

[Chemical Formula 2]

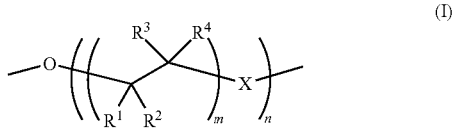

wherein X is an oxygen atom, or a carbon atom substituted with a hydrogen atom or an alkyl group, wherein $R^1$, $R^2$, $R^3$, and $R^4$ are each independently hydrogen atoms, substituted or unsubstituted alkyl groups, or substituted or unsubstituted cycloalkyl groups, and m and n are positive integers.

A polymer contains constituent units having one or both of an amide bond or an imide bond, and having a group represented by the following general formula (II):

[Chemical Formula 3]

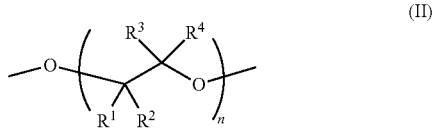

wherein, $R^1$, $R^2$, $R^3$, and $R^4$ are each independently hydrogen atoms, substituted or unsubstituted alkyl groups, or substituted or unsubstituted cycloalkyl groups, and n is a positive integer.

Such polymer is favorable from the viewpoint of improving solubility of the polymer and dispersibility of the active material.

As a substituted or unsubstituted alkyl group in $R'$, $R^2$, $R^3$, and $R^4$, an alkyl group having 1 to 30 carbon atoms is preferably used from the viewpoint of solubility, and an alkyl group having 1 to 18 carbon atoms is more preferably used.

The alkyl group may be either a linear chain or a branched chain.

Examples of alkyl groups having 1 to 30 carbon atoms include a methyl group, ethyl group, propyl group, butyl group, isopropyl group, isobutyl group, pentyl group, hexyl group, heptyl group, ethylhexyl group, octyl group, decyl group, dodecyl group, 2-butyloctyl group, octadecyl group, and the like.

As a substituted or unsubstituted cycloalkyl group in $R^1$, $R^2$, $R^3$, and $R^4$, a cycloalkyl group having 3 to 30 carbon atoms is preferably used from the viewpoint of the availability of the raw material, and a cycloalkyl group having 3 to 18 carbon atoms is more preferably used.

The cycloalkyl group may be either monocyclic or polycyclic.

Examples of the cycloalkyl group having 3 to 30 carbon atoms include a cyclopropyl group, cyclobutyl group, cyclopentyl group, cyclohexyl group, adamantyl group, and the like.

Examples of substituents in $R^1$, $R^2$, $R^3$, and $R^4$ include a halogen atom, cyano group, phenyl group, hydroxyl group, carboxyl group, and the like.

A plurality of same group or a plurality of different groups may be used in these substituents.

In addition to the above-mentioned substituents, additional suitable substituents may include an alkyl group having 1 to 12 carbon atoms, cycloalkyl group having 3 to 12 carbon atoms, and phenyl group having 1 to 12 carbon atoms.

The polymer is obtained by the reaction of a diamine with a carboxylic acid derivative, such as a carboxylic acid chloride or a carboxylic acid anhydride, or by the reaction of a diisocyanate with a carboxylic acid or an anhydride. As an example, the reaction of a trimellitic anhydride chloride with a diamine can be used to obtain a polymer containing constituent units having one or both of an amide bond or an imide bond.

[Chemical Formula 4]

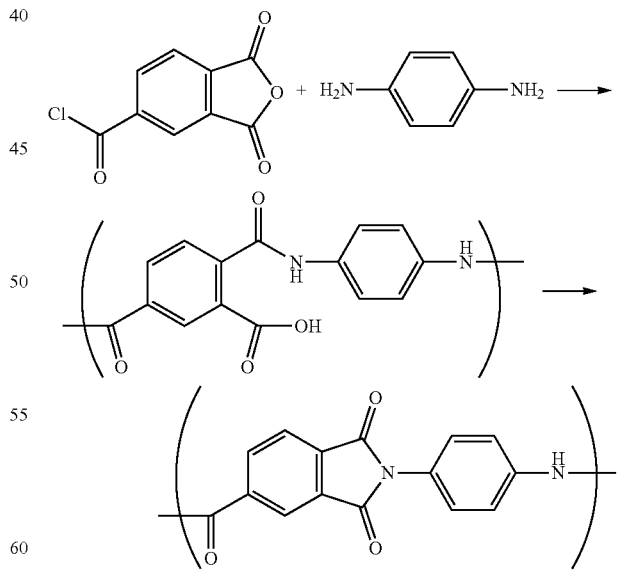

Furthermore, in the present embodiment, the polymer includes a substituent as indicated in the general formula (I). The polymer with the substituent functions as a binder that is highly soluble and that adheres to the active material and the solid electrolyte.

The mass ratio of the polymer to the active material is preferably 1 to 10%, more preferably 1 to 5%, and even more preferably 1 to 3%. When the mass ratio of the polymer to the active material is 1% or more, the adhesion between the active materials, or between the active material and an electrode substrate is improved. When the mass ratio is 5% or less, the internal resistance of the electrochemical device is reduced, thereby improving the input-output characteristics of the electrochemical device.

[Conductive Agent]

Carbon materials such as conductive carbon black, carbon nanofibers, carbon nanotubes, graphene, graphite particles, and the like can be used as a conductive agent.

The conductive carbon black may be manufactured by a furnace method, an acetylene method, a gasification method, or the like.

As conductive agents other than the above-mentioned carbon material, a metal particle such as aluminum or a metal fiber may be used.

The mass ratio of the conductive agent to the active material is preferably 10% or less and more preferably 8% or less. When the mass ratio of the conductive agent to the active material is 10% or less, the storage stability of the liquid composition for forming the electrochemical device of the present embodiment improves.

The conductive agent may be composited with the active material as described above.

[Dispersant]

A dispersant is not particularly limited as long as the dispersant is capable of improving the dispersibility of the active material and the conductive agent in the dispersion medium. Examples of dispersants include polymer-based dispersants such as a polycarboxylic acid-based dispersant, naphthalene sulfonic acid-based formalin condensation-type dispersant, polyethylene glycol-based dispersant, polycarboxylic acid-based dispersant, polyether-based dispersant, polyalkylene polyamine-based dispersant, and the like; surfactant-based dispersants such as an alkylsulfonic acid-based dispersant, quaternary ammonium salt-based dispersant, high alcohol alkylene oxide-based dispersant, polyhydric alcohol ester-based dispersant, alkyl polyamine-based dispersant, and the like; and inorganic-based dispersant such as a polyphosphate-based dispersant and the like. Among these, two or more kinds of dispersants may be used in combination.

<Method of Manufacturing Electrodes>

A method of manufacturing electrodes of the present embodiment preferably includes a step of applying a liquid composition for forming an electrochemical device of the present embodiment onto an electrode substrate, and a step of discharging the liquid composition for forming the electrochemical device of the present embodiment onto the electrode substrate.

Materials of the electrode substrate (current collector) are not particularly limited as long as the materials have conductivities and are stable to the applied potential.

The method of manufacturing electrodes of the present embodiment further preferably includes a step of pressurizing the electrode substrate on which the liquid composition has been discharged. Accordingly, the components of the electrode composite material layer are unlikely to be peeled off and the reliability of the electrochemical device improves.

[Negative-Electrode]

FIG. 1 illustrates an example of a negative-electrode of the present embodiment.

In a negative-electrode 10, a negative-electrode composite material layer 12 having a negative-electrode active material and a polymer is formed on one side of a negative-electrode substrate 11.

The negative-electrode composite material layer 12 may be formed on both surfaces of the negative-electrode substrate 11.

The shape of the negative-electrode 10 is not particularly limited and may include, for example, a flat plate.

Examples of materials constituting the negative-electrode substrate 11 include stainless steel, nickel, aluminum, copper, and the like.

[Method of Manufacturing Negative-Electrode]

Figure 2:
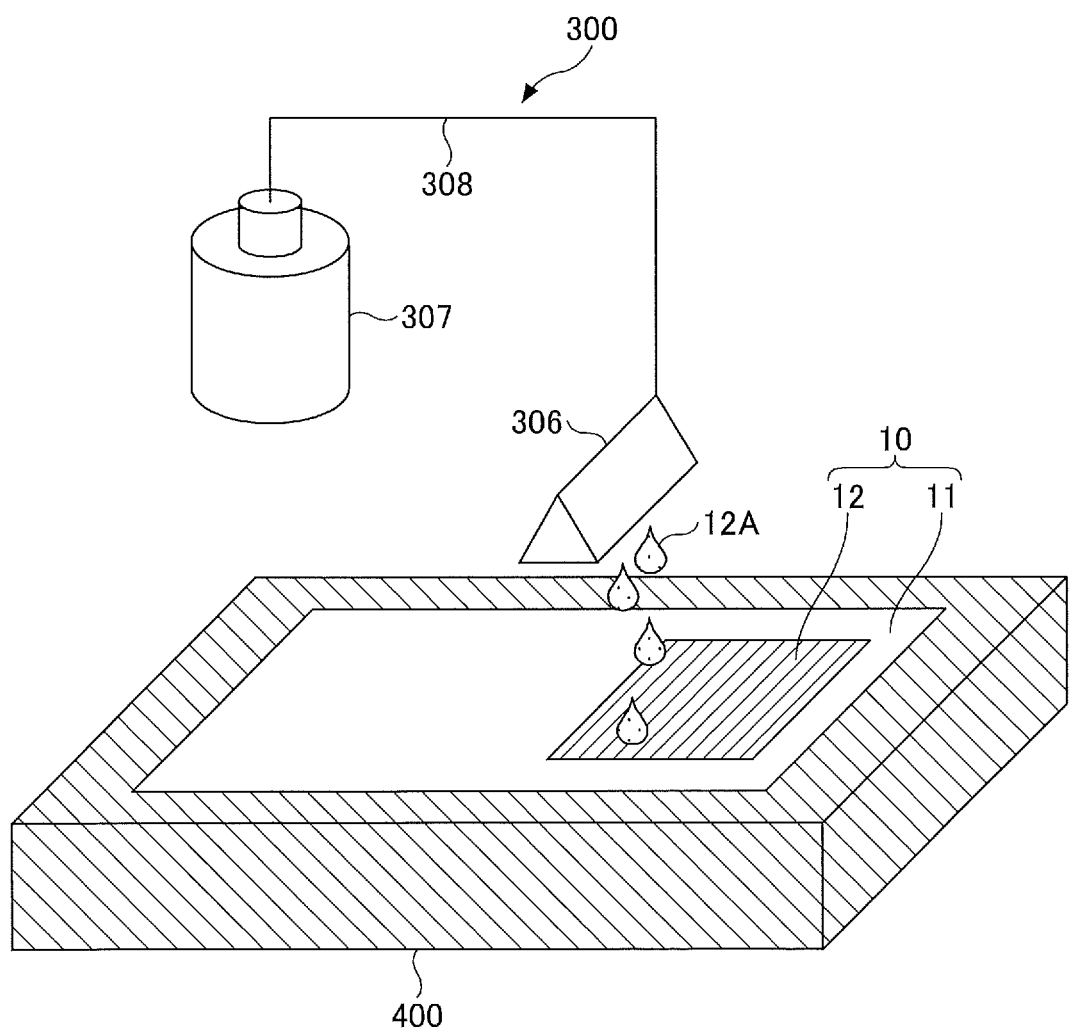
FIG. 2 is a schematic view illustrating an example of a method of manufacturing the negative-electrode of the present embodiment.

FIG. 2 illustrates an example of a method of manufacturing the negative-electrode of the present embodiment.

The method of manufacturing the negative-electrode 10 includes a step of discharging a liquid composition 12A, which is a liquid composition for forming an electrochemical device of the present embodiment, onto the negative-electrode substrate 11 using a liquid discharge device 300.

The liquid composition 12A contains a negative-electrode active material, a dispersion medium, and a polymer.

The liquid composition 12A is stored in a tank 307 and supplied from the tank 307 through a tube 308 to a liquid discharge head 306.

The liquid discharge device 300 may also be configured to cap a nozzle to prevent drying when the liquid composition 12A is not being discharged from the liquid discharge head 306.

When the negative-electrode 10 is manufactured, the negative-electrode substrate 11 is placed on a stage 400 capable of being heated, followed by discharging the droplets of the liquid composition 12A to the negative-electrode substrate 11, and then heated. The stage 400 may move, or, alternatively, the liquid discharge head 306 may move.

When the liquid composition 12A discharged to the negative-electrode substrate 11 is heated, it may be heated by the stage 400 or by another heating mechanism.

The heating mechanisms are not particularly limited as long as the heating mechanisms do not directly contact with the liquid composition 12A. Examples of the heating mechanisms include resistive heating heaters, infrared heaters, fan heaters, and the like.

A plurality of heating mechanisms may be provided.

The heating temperature is not particularly limited as long as the heating temperature is the temperature sufficient to volatilize the dispersion medium. The heating temperature is preferably in the range of 70 to 150° C. in terms of power consumption.

When the liquid composition 12A discharged onto the negative-electrode substrate 11 is heated, a UV light may be used to heat the liquid composition.

Figure 3:
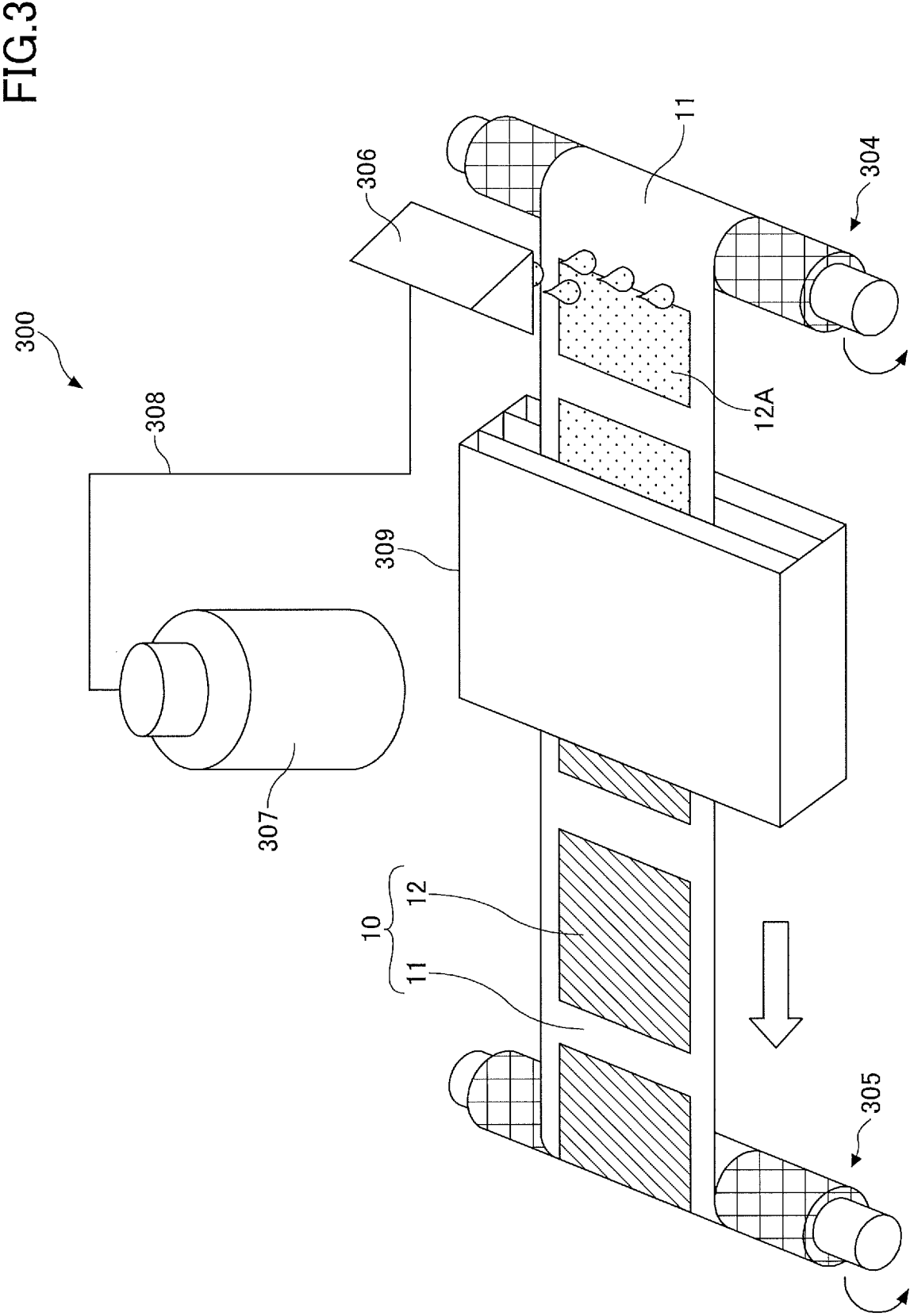
FIG. 3 is a schematic view illustrating another example of a method of manufacturing the negative-electrode of the present embodiment.

FIG. 3 illustrates another example of a method of manufacturing the negative-electrode of the present embodiment.

A method of manufacturing the negative-electrode 10 includes a step of discharging the liquid composition 12A onto the negative-electrode substrate 11 using the liquid discharging device 300.

First, a length of the negative-electrode substrate 11 is prepared. Then, the negative-electrode substrate 11 is wound around a cylindrical core, and the side forming the negative-electrode composite material layer 12 is set to a feed roller 304 and a take-up roller 305 so as to be on the upper side in the drawing. The feed roller 304 and the take-up roller 305 rotate counterclockwise, and the negative-electrode substrate 11 is conveyed in the right direction to the left direction in the drawing. The droplets of the liquid composition 12A are discharged from the liquid discharge head 306 disposed above the negative-electrode substrate 11 between the feed roller 304 and the take-up roller 305 onto the negative-electrode substrate 11 to be conveyed. The droplets of the liquid composition 12A are discharged to cover at least a portion of the negative-electrode substrate 11.

A plurality of liquid discharge heads 306 may be disposed in a direction substantially parallel to or substantially perpendicular to the conveying direction of the negative-electrode substrate 11.

Next, the negative-electrode substrate 11, onto which the liquid composition 12A is discharged, is conveyed to the heating mechanism 309 by the feed roller 304 and the take-up roller 305. As a result, the dispersion medium contained in the liquid composition 12A on the negative-electrode substrate 11 is volatilized to form the negative-electrode composite material layer 12 to obtain the negative-electrode 10. The negative-electrode 10 is then cut to a desired size by a punching process or the like.

The heating mechanism 309 is not particularly limited as long as the heating mechanism does not directly contact with the liquid composition 12A. Examples of the heating mechanisms include resistive heating heaters, infrared heaters, fan heaters, and the like.

The heating mechanism 309 may be disposed on one of the upper and lower portions of the negative-electrode substrate 11, or a plurality of the heating mechanisms may be disposed.

The heating temperature is not particularly limited as long as the heating temperature is the temperature sufficient to volatilize the dispersion medium. The heating temperature is preferably in the range of 70 to 150° C. in terms of power consumption.

When the liquid composition 12A discharged onto the negative-electrode substrate 11 is heated, a UV light may be used to heat the liquid composition.

Figure 4:
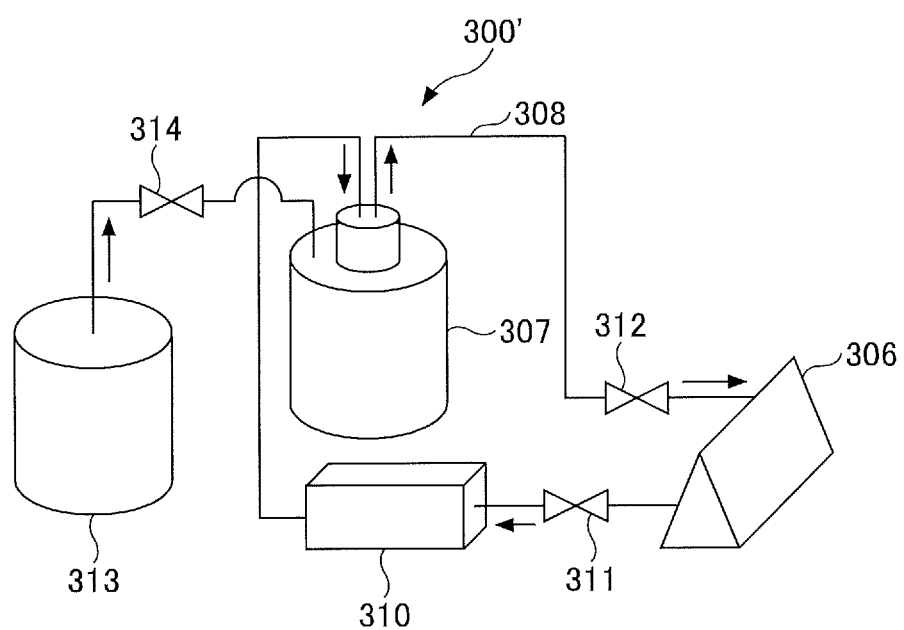
FIG. 4 is a schematic diagram illustrating a modified example of a liquid discharge device of FIGS. 2 and 3.

FIG. 4 illustrates a modified example of the liquid discharge device 300.

A liquid discharge device 300' controls a pump 310 and valves 311, 312 to allow the liquid composition. 12A to circulate through the liquid discharge head 306, the tank 307, and the tube 308.

The liquid discharge device 300' may also be provided with an external tank 313 to supply the liquid composition 12A from the external tank 313 to the tank 307 by controlling the pump 310 and the valves 311, 312, and 314 when the liquid composition 12A within the tank 307 is reduced.

The liquid discharge devices 300, 300' can be used to discharge the liquid composition 12A to the intended location of the negative-electrode substrate 11. Further, when the liquid discharge devices 300 and 300' are used, surfaces that contact the negative-electrode substrate 11 and the negative-electrode composite material layer 12 can be adhered to each other. Furthermore, the thickness of the negative-electrode composite material layer 12 can be evenly formed using the liquid discharge devices 300, 300'.

[Positive-Electrode]

Figure 5:
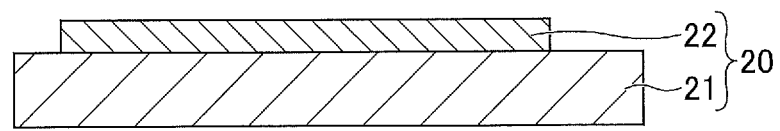
FIG. 5 is a cross-sectional view illustrating an example of a positive-electrode of the present embodiment.

FIG. 5 illustrates an example of a positive-electrode of the present embodiment.

In a positive-electrode 20, a positive-electrode composite material layer 22 having a positive-electrode active material and a polymer is formed on one side of a positive-electrode substrate 21.

The positive-electrode composite material layer 22 may be formed on both surfaces of the positive-electrode substrate 21.

The shape of the positive-electrode 20 is not particularly limited. For example, the positive-electrode may be formed in the shape of a flat plate.

Examples of the materials constituting the positive-electrode substrate 21 include stainless steel, aluminum, titanium, tantalum, and the like.

[Method of Manufacturing Positive-Electrode]

The method of manufacturing the positive-electrode 20 is similar to the method of manufacturing the negative-electrode 10 except that the liquid composition is discharged onto the positive-electrode substrate 21.

The liquid composition contains a positive-electrode active material, a dispersion medium, and a polymer, and may contain an electrolyte component.

<Method of Manufacturing Electrochemical Device>

A method of manufacturing an electrochemical device of the present embodiment includes a step of manufacturing electrodes using the method of manufacturing electrodes of the present embodiment.

[Electrode Element]

Figure 6:
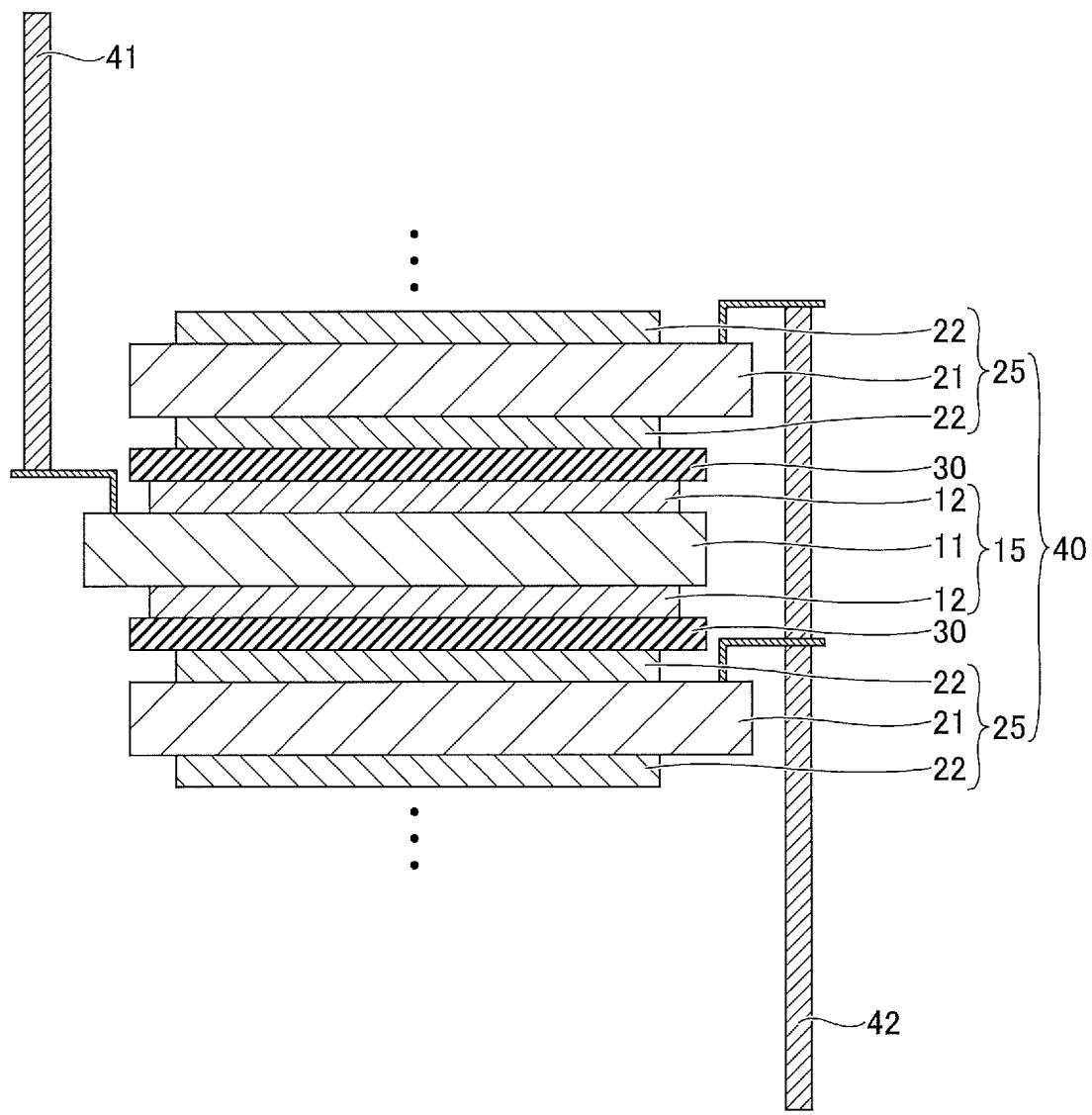
FIG. 6 is a cross-sectional view illustrating an example of an electrode element constituting an electrochemical device of the present embodiment.

FIG. 6 illustrates an example of an electrode element constituting an electrochemical device of the present embodiment.

In an electrode element 40, a negative-electrode 15 and a positive-electrode 25 are laminated through a separator 30. The positive-electrode 25 is laminated to both sides of the negative-electrode 15. A lead line 41 is connected to the negative-electrode substrate 11, and a lead line 42 is connected to the positive-electrode substrate 21.

The negative-electrode 15 is similar to the negative-electrode 10 except that the negative-electrode composite material layer 12 is formed on both sides of the negative-electrode substrate 11.

The positive-electrode 25 is similar to the positive-electrode 20 except that the positive-electrode composite material layer 22 is formed on both sides of the positive-electrode substrate 21.

The number of layers of the negative-electrode 15 and the positive-electrode 25 of the electrode element 40 is not particularly limited.

The number of the negative-electrode 15 and the number of the positive-electrode 25 of the electrode element 40 may be the same or may be different.

(Separator)

A separator 30 is provided between the negative-electrode 15 and the positive-electrode 25 to prevent short-circuiting between the negative-electrode 15 and the positive-electrode 25.

Examples of suitable materials for the separator 30 include paper such as kraft paper, vinylon mixed paper, synthetic pulp mixed paper, polyolefin non-woven fabric such as cellophane, polyethylene graft film, polypropylene meltblown non-woven fabric, polyamide non-woven fabric, glass fiber non-woven fabric, micropore membrane, and the like.

The size of the separator 30 is not particularly limited as long as the separator 30 can be used in the electrochemical device.

The separator 30 may be a single layered structure or a laminated structure.

When a solid electrolyte is used, the separator 30 may be omitted.

<Electrochemical Device>

Figure 7:
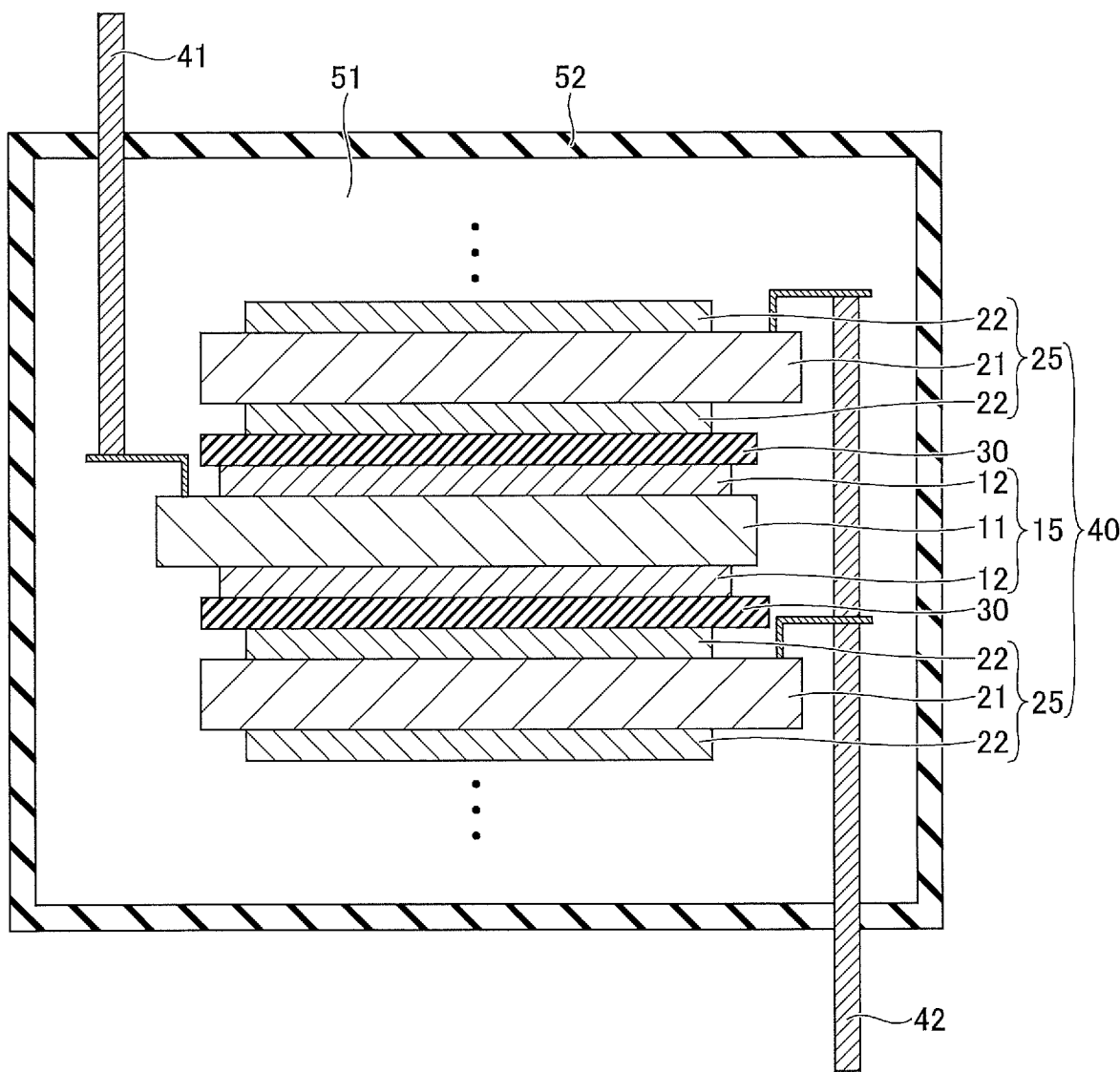
FIG. 7 is a cross-sectional view illustrating an example of the electrochemical device of the present embodiment.

FIG. 7 illustrates a secondary battery as an example of the electrochemical device of the present embodiment.

In a secondary battery 1, an electrolyte layer 51 is formed by injecting an aqueous electrolyte solution or a non-aqueous electrolyte, and sealed by an outer sheath 52. In the secondary battery 1, the lead lines 41 and 42 are drawn out of the outer sheath 52.

The secondary battery 1 may have other parts as needed.

The secondary battery 1 is not particularly limited. For example, a lithium-ion secondary battery may be used.

The shape of the secondary battery 1 is not particularly limited. Suitable shapes for the secondary battery 1 include a laminate type; a cylinder type in which a sheet electrode and a separator are spiraled; a cylinder type with an in-side out structure in which a pellet electrode and a separator are combined; a button cell in which a pellet electrode and a separator are laminated; and the like.

[Electrolyte]

An electrolyte may be an aqueous electrolyte solution or a non-aqueous electrolyte.

(Aqueous Electrolyte Solution)

Examples of electrolyte salts constituting the aqueous electrolyte solution include sodium hydroxide, potassium hydroxide, sodium chloride, potassium chloride, ammonium chloride, zinc chloride, zinc acetate, zinc bromide, zinc iodide, zinc tartrate, zinc perchlorate, and the like.

(Non-Aqueous Electrolyte)

As the non-aqueous electrolyte, a non-aqueous electrolyte solution or a solid electrolyte may be used.

(Non-Aqueous Electrolyte Solution)

The non-aqueous electrolyte solution is an electrolyte solution in which the electrolyte salt is dissolved in a non-aqueous solvent.

[Electrolyte Salt]

An electrolyte salt is not particularly limited, as long as the electrolyte salt has high ionic conductivity and can be dissolved in a non-aqueous solvent.

The electrolyte salt preferably contains a halogen atom.

Examples of the cations constituting the electrolyte salt include lithium-ions and the like.

Examples of the anions constituting the electrolyte salt include $BF_4^-$, $PF_6^-$, $AsF_6^-$, $CF_3SO_3^-$, $(CF_3SO_2)_2N^-$, $(C_2F_5SO_2)_2N^-$, and the like.

The lithium salts are not particularly limited and can be appropriately selected depending on the purpose. Examples of the lithium salts include lithium hexafluorophosphate ($LiPF_6$), lithium borofluoride ($LiBF_4$), lithium arsenide ($LiAsF_6$), lithium trifluorometasulfonate ($LiCF_3SO_3$), lithium bis (trifluoromethylsulfonyl) imide ($LiN(CF_3SO_2)_2$), lithium bis (pentafluoroethylsulfonyl) imide ($LiN(C_2F_5SO_2)_2$), and the like. Among these, $LiPF_6$ is preferably used from the viewpoint of ionic conductivity, and $LiBF_4$ is preferably used from the viewpoint of stability.

The electrolyte salt may be used alone or two or more kinds may be used in combination.

The concentration of the electrolyte salt in the non-aqueous electrolyte solution can be appropriately selected depending on the purpose. When the non-aqueous battery element is of the swing type, the concentration of the electrolyte salt is preferably 1 mol/L to 2 mol/L. When the non-aqueous battery element is a reservoir type, the concentration of the electrolyte salt is preferably 2 mol/L to 4 mol/L.

[Non-Aqueous Solvent]

The non-aqueous solvent is not particularly limited. For example, an aprotic organic solvent is preferably used.

Suitable aprotic organic solvents may include carbonate-based organic solvents such as a chain carbonate or a cyclic carbonate. Of these, a chain carbonate is preferably used because of the high solubility of the electrolyte salt.

Preferably, the aprotic organic solvent has a low viscosity.

Examples of the chain carbonates include dimethyl carbonate (DMC), diethyl carbonate (DEC), methyl ethyl carbonate (EMC), and the like.

The non-aqueous solvent preferably includes the chain carbonate in an amount of 50% by mass or more. When the content of the chain carbonate in the non-aqueous solvent is 50% by mass or more, the content of cyclic material is reduced even when the non-aqueous solvent other than the chain carbonate is a cyclic material having a high dielectric constant (e.g., cyclic carbonate, cyclic ester). Therefore, even when a non-aqueous electrolytic solution having a high concentration, for example, of 2 M or more, is prepared, the viscosity of the non-aqueous electrolytic solution decreases, and impregnation and ion diffusion into the electrode of the non-aqueous electrolytic solution becomes favorable.

Examples of the cyclic carbonate include propylene carbonate (PC), ethylene carbonate (EC), butylene carbonate (BC), vinylene carbonate (VC), and the like.

The non-aqueous solvent other than the carbonate organic solvent includes, for example, ester-based organic solvents such as a cyclic ester or a chain ester, ether-based organic solvents such as a cyclic ether or a chain ether, or the like.

Examples of cyclic esters include γ-butyrolactone (γBL), 2-methyl-γ-butyrolactone, acetyl-γ-butyrolactone, γ-valerolactone, and the like.

Examples of chain esters include propionic acid alkyl ester, malonic acid dialkyl ester, acetic acid alkyl ester (e.g., methyl acetate (MA), ethyl acetate), formic acid alkyl ester (e.g., methyl formate (MF), ethyl formate), and the like.

Examples of cyclic ethers include tetrahydrofuran, alkyltetrahydrofuran, alkoxytetrahydrofuran, dialkoxytetrahydrofuran, 1,3-dioxolane, alkyl-1,3-dioxolane, 1,4-dioxolane, and the like.

Examples of chain ethers include 1,2-dimethoxyethane (DME), diethyl ether, ethylene glycol dialkyl ether, diethylene glycol dialkyl ether, triethylene glycol dialkyl ether, tetraethylene glycol dialkyl ether, and the like.

[Solid Electrolyte]

A solid electrolyte is capable of withstanding high voltage, has electronic insulation, and exhibits ionic conductivity. Materials constituting a solid electrolyte layer are not particularly limited as long as the materials have electronic insulation and exhibit ionic conductivity, therefore, any suitable materials may be used. As the materials constituting the solid electrolyte layer, a sulfide-based solid electrolyte or an oxide-based solid electrolyte is preferably used from the viewpoint of high ionic conductivity.

Examples of the sulfide-based solid electrolyte include $Li_{10}GeP_2S_{12}$ or $Li_6PS_5X$ (where X is F, Cl, Br or I), which has an aldilodite-type crystal structure.

Examples of the oxide-based solid electrolyte include LLZ ($Li_7La_3Zr_2O_{12}$), which has a garnet-type crystal structure, or LATP ($Li_{1+x}Al_xTi_2O_x(PO_4)_3$), which has a NASICON-type crystal structure ($0.1 \leq X \leq 0.4$), LLT ($Li_{0.33}La_{0.55}TiO_3$), which has a perovskite-type crystal structure, and LIPON ($Li_{2.9}PO_{3.3}N_{0.4}$), which has an amorphous-type crystal structure. A single solid electrolyte, or a combination of two or more, may be used.

Examples of the electrolyte materials dissolved or dispersed in the liquid to form the solid electrolyte layer include $Li_2S$, $P_2S_5$, and $LiCl$, which are precursors of the solid electrolyte, $Li_2S$—$P_2S_5$ based glass and $Li_7P_3S_{11}$ glass ceramics, which are materials of the solid electrolyte.

Materials used to form a gel electrolyte layer can also be used as an electrolyte.

The gel electrolyte is not particularly limited as long as the gel electrolyte exhibits ionic conductivity. For example, polymers constituting the network structure of the gel electrolyte include polyethylene oxide, polypropylene oxide, polyacrylonitrile, polymethyl methacrylate, polyvinyl chloride, copolymers of vinylidene fluoride and propylene hexafluoride, polyethylene carbonate, and the like.

Solvent molecules retained in the gel electrolyte include ionic liquids. Examples of ionic liquids include methyl-1-propylpyrrolidinium bis (fluorosulfonylimide), 1-butyl-1-methylpyrrolidinium bis (fluorosulfonylimide), 1-methyl-1-propylpiperidinium bis (fluorosulfonylimide), 1-ethyl-3-methylimidazolium bis (fluorosulfonylimide), 1-methyl-3-propylimidazolium bis (fluorosulfonylimide), N,N-diethyl-N-methyl-N-(2-methoxyethyl) ammonium bis (fluorosulfonyl) imide.

The ionic liquid may be a mixture of a liquid and a lithium salt such as tetraglyme, propylene carbonate, fluoroethylene carbonate, ethylene carbonate, diethyl carbonate, or the like.

The lithium salts are not particularly limited and can be appropriately selected depending on the purpose. Examples of the lithium salts include lithium hexafluorophosphate ($LiPF_6$), lithium borofluoride ($LiBF_4$), lithium arsenide ($LiAsF_6$), lithium trifluorometasulfonate ($LiCF_3SO_3$), lithium bis (trifluoromethylsulfonyl) imide ($LiN(CF_3SO_2)_2$), lithium bis (pentafluoroethylsulfonyl) imide ($LiN(C_2F_5SO_2)_2$), and the like.

These ionic liquids and lithium salts contained in the gel electrolyte may be used alone or two or more kinds in combination.

To form these gel electrolyte layers, the electrolyte materials dissolved or dispersed in a liquid may be a solution containing the polymer compound and the ionic liquid or lithium salt. The electrolyte material to be dissolved or dispersed in the liquid may be a precursor material of a gel electrolyte (for example, a combination of a solution having an ionic liquid or a lithium salt dissolved therein and a poethylene oxide or polypropylene oxide having both ends as an acrylate group).

When these solid electrolytes and gel electrolytes are used, they can be constituted as a liquid composition along with an active material.

[Application of Electrochemical Devices]

Applications of electrochemical devices include, but are not limited to, notebook PCs, pen input PCs, mobile PCs, electronic book players, cellular phones, portable faxes, portable copies, portable printers, headphone stereos, video movies, LCD TVs, handy cleaners, portable CDs, mini disks, transceivers, electronic pocketbooks, calculators, memory cards, portable tape recorders, radio, backup power supplies, motors, lighting fixtures, toys, game machines, clocks, strobe boxes, cameras, and the like.

EXAMPLES

Hereinafter, examples of the present invention will be described, but the present invention is not limited to examples.

A particle size distribution of an active material, a viscosity and a particle size distribution of a liquid composition for forming an electrochemical device were measured by the following method.

<Particle Size Distribution of Active Material>

After the active material was dispersed in water, the particle size distribution of the active material was measured at a temperature of 25° C. using a laser diffraction particle size measuring device, Master Sizer 3000 (manufactured by Malvern Panalytical Ltd.).

<Viscosity of Liquid Composition for Forming Electrochemical Device>

A No. CPA-40Z rotor was fitted to a B-type viscometer (cone plate-type viscometer) to measure the viscosity of the liquid composition for forming an electrochemical device. The viscosity was measured by the B-type viscometer at a speed of 100 rpm and a temperature of 25° C.

<Particle Size Distribution of Liquid Composition for Forming Electrochemical Device>

A Master Sizer 3000 (manufactured by Malvern Panalytical Ltd.) was used to measure the particle size distribution of the liquid composition for forming an electrochemical device at a temperature of 25° C.

<Production of Positive-Electrode Active Materials>

[Production of Positive-Electrode Active Material 1]

Vanadium pentoxide, lithium hydroxide, phosphoric acid, sucrose, and water were mixed to form a precipitate, spray dried in a spray dryer, and the precipitate was pulverized in a jet mill to obtain a precursor of lithium vanadium phosphate ($Li_3V_2(PO_4)_3$) particles. Next, the precursor of lithium vanadium phosphate particles was fired at 900° C. under a nitrogen atmosphere to obtain lithium vanadium phosphate particles containing 3% by mass of carbon. The lithium vanadium phosphate particles were then pulverized in a jet mill until the portion of particles having a $D_{90}$ particle diameter of less than 3 μm to obtain a positive-electrode active material 1. The positive-electrode active material 1 had a mode field diameter of 0.7 μm.

[Production of Positive-Electrode Active Material 2]

Lithium iron phosphate ($LiFePO_4$) particles (manufactured by Sigma-Aldrich Co., LLC.) were pulverized in a jet mill to a $D_{90}$ particle diameter of less than 3 μm to obtain a positive-electrode active material 2. The positive-electrode active material 2 had a mode field diameter of 0.6 μm.

[Production of Positive-Electrode Active Material 3]

Lithium cobalt oxide ($LiCoO_2$) particles (manufactured by Sigma-Aldrich Co., LLC.) were pulverized in a jet mill to a $D_{90}$ particle diameter of less than 3 μm to obtain the positive-electrode active material 3. The positive-electrode active material 3 had a mode field diameter of 0.9 μm.

[Production of Positive-Electrode Active Material 4]

Lithium nickel oxide ($LiNi_{0.8}Co_{0.15}Al_{0.05}O_2$) particles (manufactured by Sigma-Aldrich Co., LLC.) were pulverized in a jet mill to a $D_{90}$ particle diameter of less than 3 μm to obtain the positive-electrode active material 4. The positive-electrode active material 4 had a mode field diameter of 1.2 μm.

[Production of Positive-Electrode Active Material 5]

Ni—Mn—Co-based ($LiNi_{1/3}Mn_{1/3}CO_{1/3}O_2$) particles (manufactured by Sigma-Aldrich Co., LLC.) were pulverized in a jet mill to a $D_{90}$ particle diameter of less than 3 μm to obtain a positive-electrode active material 5. The positive-electrode active material 5 had a mode field diameter of 0.9 μm.

[Production of Positive-Electrode Active Material 6]

Lithium manganese oxide ($LiMn_2O_4$) particles (manufactured by Sigma-Aldrich Co., LLC.) were pulverized in a jet mill to a $D_{90}$ particle diameter of less than 3 μm to obtain a positive-electrode active material 6. The positive-electrode active material 6 had a mode field diameter of 1.2 μm.

<Production of Negative-Electrode Active Materials>

[Production of Negative-Electrode Active Material 1]

An artificial graphite (manufactured by MT Carbon Co; Ltd.) was pulverized in a jet mill to a $D_{90}$ particle diameter of less than 3 μm to obtain a negative-electrode active material 1. The negative-electrode active material 1 had a mode field diameter of 1.8 μm.

[Production of Negative-Electrode Active Material 2]

Lithium titanium oxide ($Li_4Ti_5O_{12}$) (manufactured by Sigma-Aldrich Co., LLC.) particles were pulverized in a jet mill to a $D_{90}$ particle diameter of less than 3 μm to obtain the negative-electrode active material 2. The negative-electrode active material 2 had a mode field diameter of 0.7 μm.

<Production of Polymers>

[Synthesis of Polymer 1]

Polymer 1 was synthesized according to the following scheme.

[Chemical Formula 5]

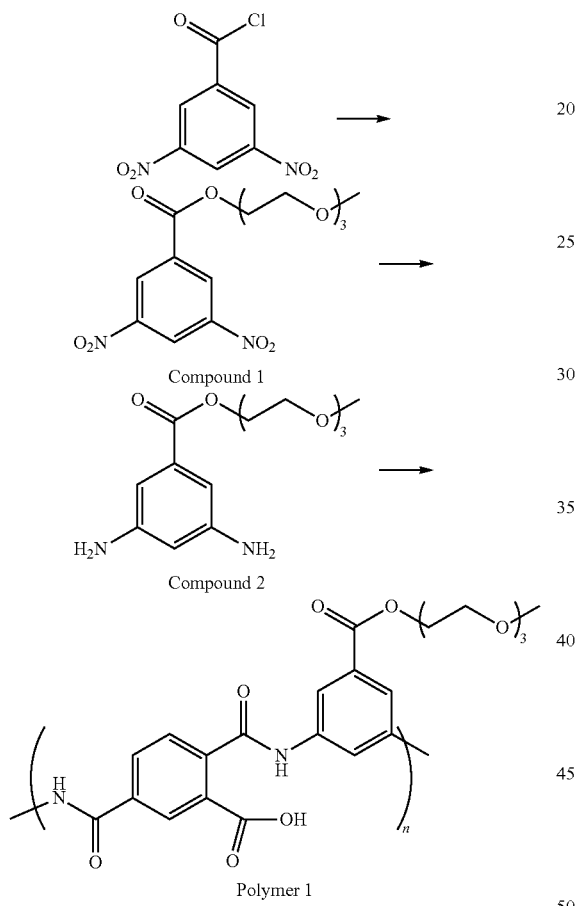

(Synthesis of Compound 1)

After 4.63 g (28.2 mmol) of triethylene glycol monomethyl ether and 80 ml of tetrahydrofuran were added to a flask, a reaction system was substituted with nitrogen. Next, the reaction solution was cooled to 0° C. and 5.00 g (21.7 mmol) of 3,5-dinitrobenzoyl chloride was added. Then 4.60 ml (32.5 mmol) of triethylamine was slowly added dropwise and the reaction solution was allowed to cool to room temperature and stirred overnight. The reaction solution was then filtered through celite and the solvent was removed from the filtrate under reduced pressure. The residue was then purified by a column chromatography to obtain Compound 1.

(Synthesis of Compound 2)

Next, 0.7 g of the resulting compound 1, 10% palladium carbon, and 80 ml of ethyl acetate were added to a flask, the mixture in the flask was stirred under a hydrogen atmosphere until consumption of hydrogen ceased. The reaction solution was then filtered through celite and the filtrate purified by a column chromatography to obtain Compound 2 (5.69 g; 88% yield).

[Synthesis of Polymer 1]

After 1.50 g (5.03 mmol) of the compound 2, 30 ml of DMF, and 0.7 ml of triethylamine were added in a flask, a reaction system was substituted with nitrogen. Next, 1.06 g (5.03 mmol) of trimellitic anhydride chloride was added to the reaction solution and stirred for 10 hours. Then, water was added to the reaction solution, and the precipitated solid was filtered off. The resulting solid was vacuum died to obtain Polymer 1 (1.92 g; 81% yield).

[Synthesis of Polymer 2]

Polymer 2 was synthesized according to the following scheme. That is, after 0.40 g of the Polymer 1 was weighed on a glass dish, it was allowed to stand at 180° C. for 2 hours in the atmosphere to obtain Polymer 2 (0.37 g). The molecular weights of polystyrene equivalent by GPC were Mw: 4904 and Mn: 2820. The Polymer 2 was soluble in solvents such as NMP, DMF, DMA, DMSO, and the like.

[Chemical Formula 6]

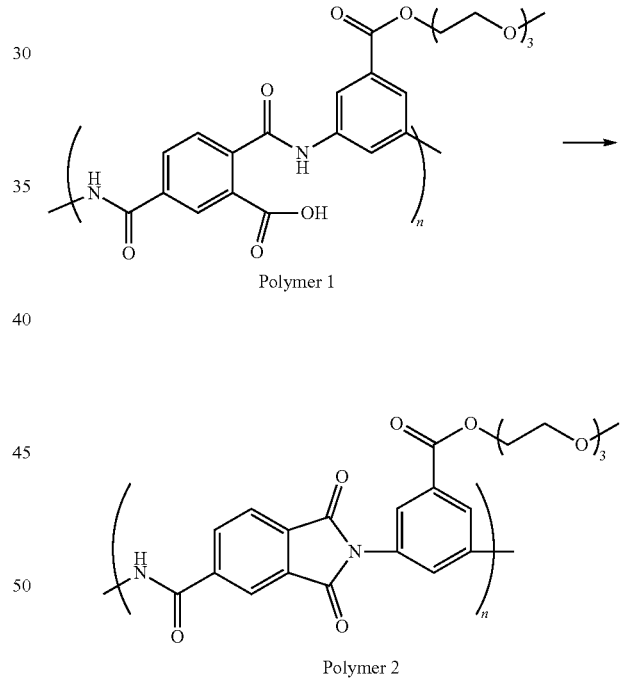

[Synthesis of Polymer 3]

Polymer 3 was synthesized according to the following scheme. That is, 0.50 g of the Polymer 1, 5 ml of DMF, and 5 ml of methanol were added to a flask. Next, a 0.6 M solution of trimethylsilyldiazomethane in hexane was added to the reaction solution and stirred at room temperature for 2 hours. The solvent was then evaporated from the reaction solution under reduced pressure. The residue was then washed with ethyl acetate and vacuum dried to obtain Polymer 3.

[Chemical Formula 7]

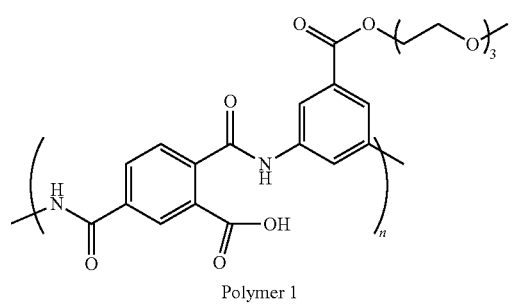

Polymer 1

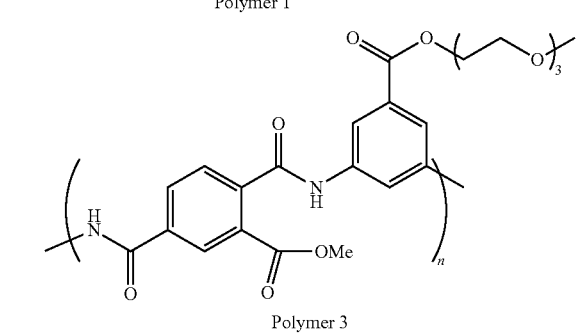

Polymer 3

[Synthesis of Polymer 4]

Polymer 4 was synthesized according to the following scheme. That is, Polymer 4 was synthesized in the same manner as the Polymer 1 except that tripropylene glycol monomethyl ether was used instead of triethylene glycol monomethyl ether.

[Chemical Formula 8]

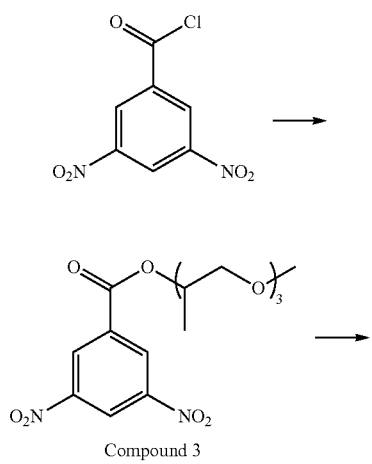

Compound 3

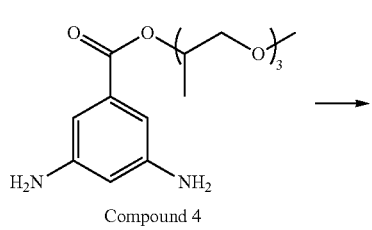

Compound 4

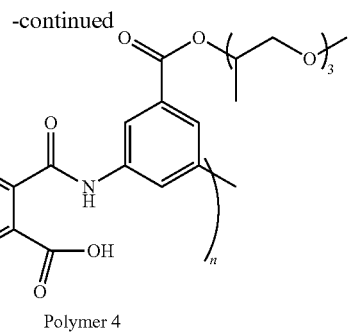

Polymer 4

[Synthesis of Polymer 5]

Polymer 5 was synthesized according to the following scheme. That is, Polymer 5 was synthesized in the same manner as the Polymer 2 except that the Polymer 4 was used instead of the Polymer 1. The molecular weights of polystyrene equivalent by GPC were Mw: 8960 and Mn: 4360. The Polymer 5 was soluble in solvents such as NMP, DMF, DMA, DMSO, THF, ethyl lactate, acetone, cyclohexanone, and the like.

[Chemical Formula 9]

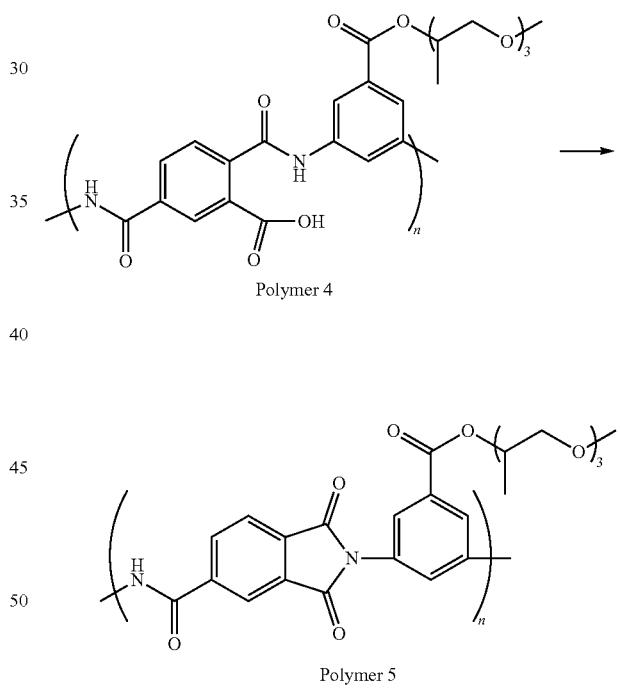

Polymer 5

[Synthesis of Polymer 6]

Polymer 6 was synthesized according to the following scheme. That is, 0.33 g (1.10 mmol) of the Compound 2, 1.13 g (3.30 mmol) of the Compound 4, 30 ml of DMF were placed in a flask and then the reaction system was substituted with nitrogen. Next, 0.93 g (4.40 mmol) of trimellitic anhydride chloride was added to the reaction solution. Then 0.61 ml of triethylamine was added dropwise and stirred at room temperature for 10 hours. Then, water was added to the reaction solution, and the precipitated solid was filtered off. The resulting solid was then vacuum dried to obtain Polymer 6 (2.10 g; up to 100% yield).

[Chemical Formula 10]

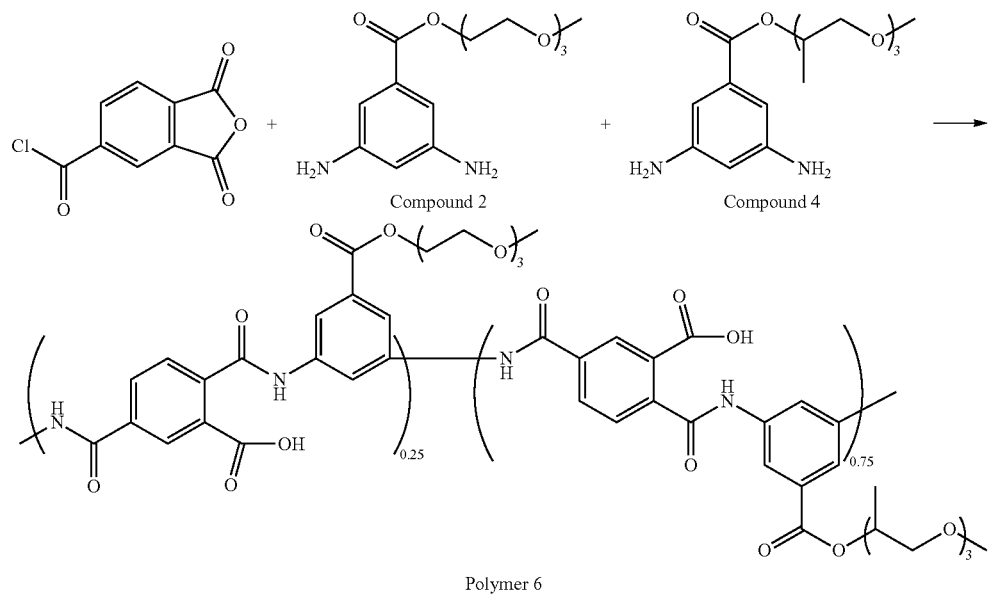

Polymer 6

[Synthesis of Polymer 7]

Polymer 7 was synthesized according to the following scheme. That is, Polymer 7 was synthesized in the same manner as the Polymer 2 except that the Polymer 6 was used instead of the Polymer 1. The molecular weights of polystyrene equivalent by GPC were Mw: 5780 and Mn: 2860. The Polymer 7 was soluble in solvents such as NMP, DMF, DMA, DMSO, THF, ethyl lactate, acetone, cyclohexanone, and the like.

[Chemical Formula 11]

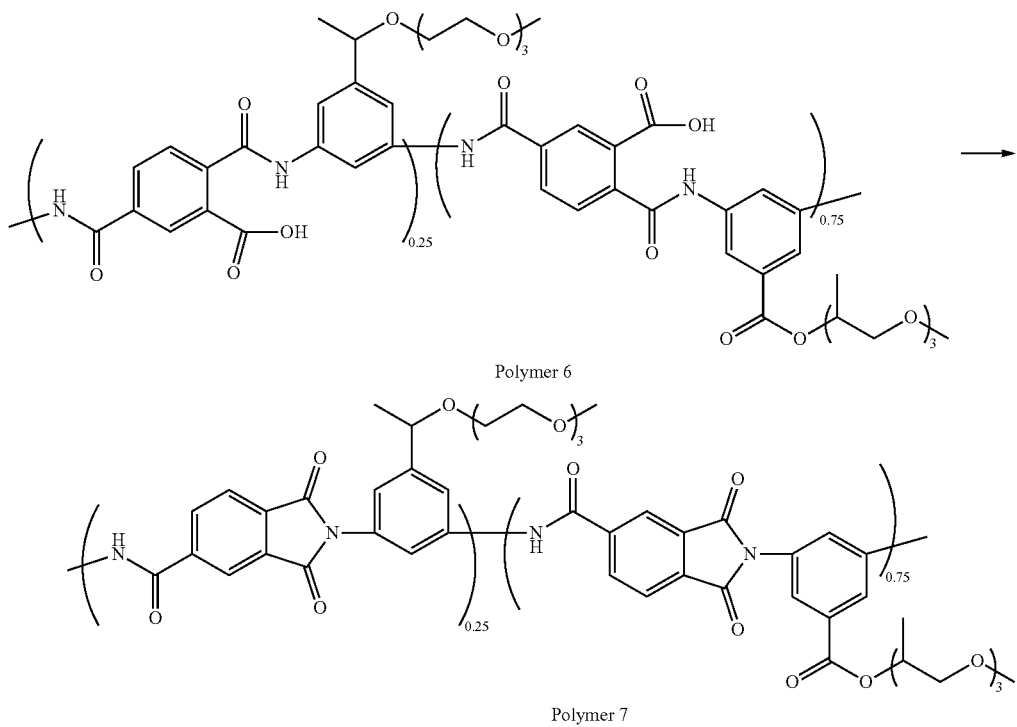

Polymer 6

Polymer 7

[Synthesis of Polymer 8]

Polymer 8 was synthesized according to the following scheme. That is, Polymer 8 was synthesized in the same manner as the Polymer 1 except that 3,7-dimethyl octanol was used instead of triethylene glycol monomethyl ether.

[Chemical Formula 12]

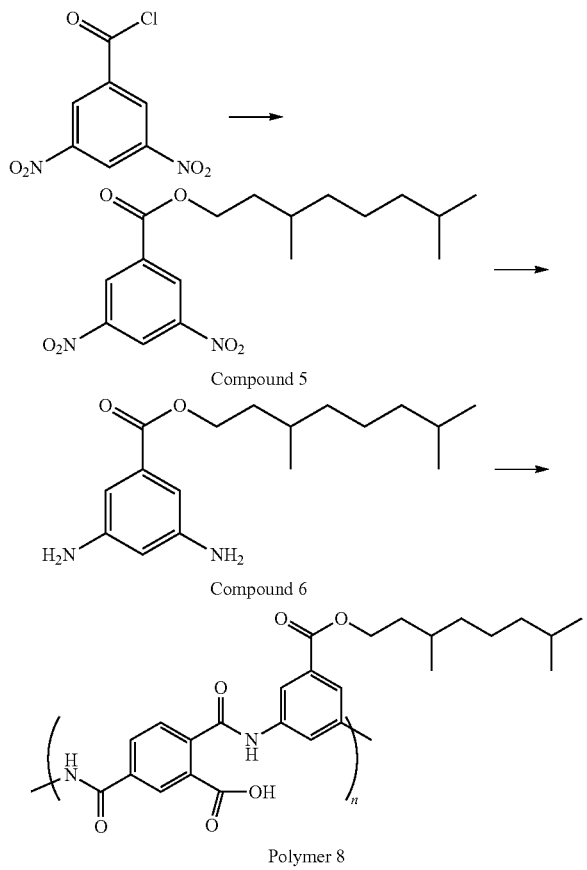

Polymer 8

[Synthesis of Polymer 9]

Polymer 9 was synthesized according to the following scheme. That is, Polymer 9 was synthesized in the same manner as the Polymer 2 except that the Polymer 8 was used instead of the Polymer 1. The molecular weights of polystyrene equivalent by GPC were Mw: 3687 and Mn: 1820. The Polymer 9 was soluble in solvents such as NMP, DMF, DMA, DMSO, THF, 1,2-diethoxyethane, chloroform, anisole, and the like.

[Chemical Formula 13]

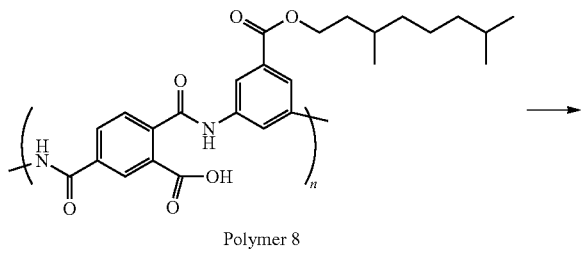

Polymer 8

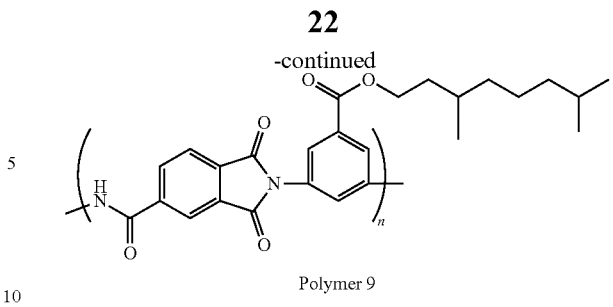

Polymer 9

[Synthesis of Polymer 10]

Polymer 10 was synthesized according to the following scheme. That is, Polymer 10 was synthesized in the same manner as the Polymer 1 except that 2-ethylhexanol was used instead of triethylene glycol monomethyl ether.

[Chemical Formula 14]

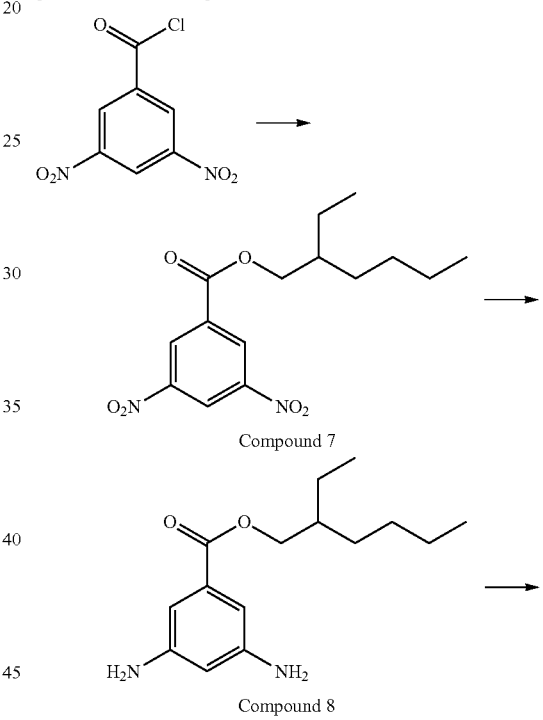

Polymer 10

[Synthesis of Polymer 11]

Polymer 11 was synthesized according to the following scheme. That is, Polymer 11 was synthesized in the same manner as the Polymer 2 except that the Polymer 10 was used instead of the Polymer 1. The molecular weights of polystyrene equivalent by GPC were Mw: 3820 and Mn:

2100. The Polymer 11 was soluble in solvents such as NMP, DMF, DMA, DMSO, 1,2-diethoxyethane, THF, chloroform, anisole, and the like.

[Chemical Formula 15]

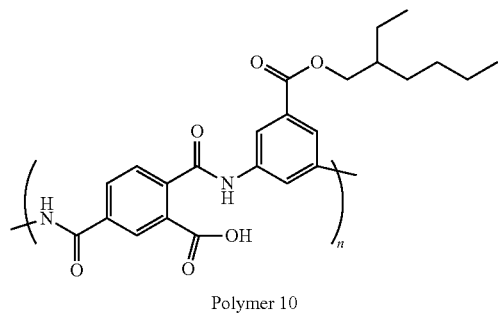

Polymer 10

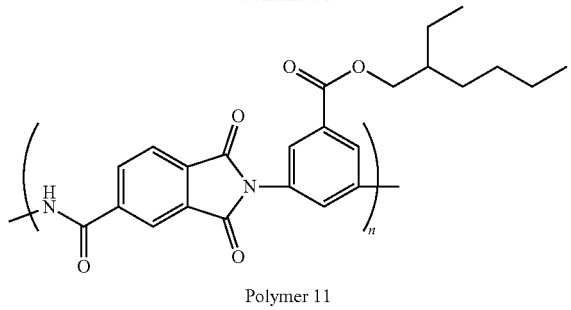

Polymer 11

[Synthesis of Polymer 12]

Polymer 12 was synthesized according to the following scheme. That is, Polymer 12 was synthesized in the same manner as the Polymer 6, except that the Compounds 6 and 7 were used instead of the Compounds 2 and 4.

[Chemical Formula 16]

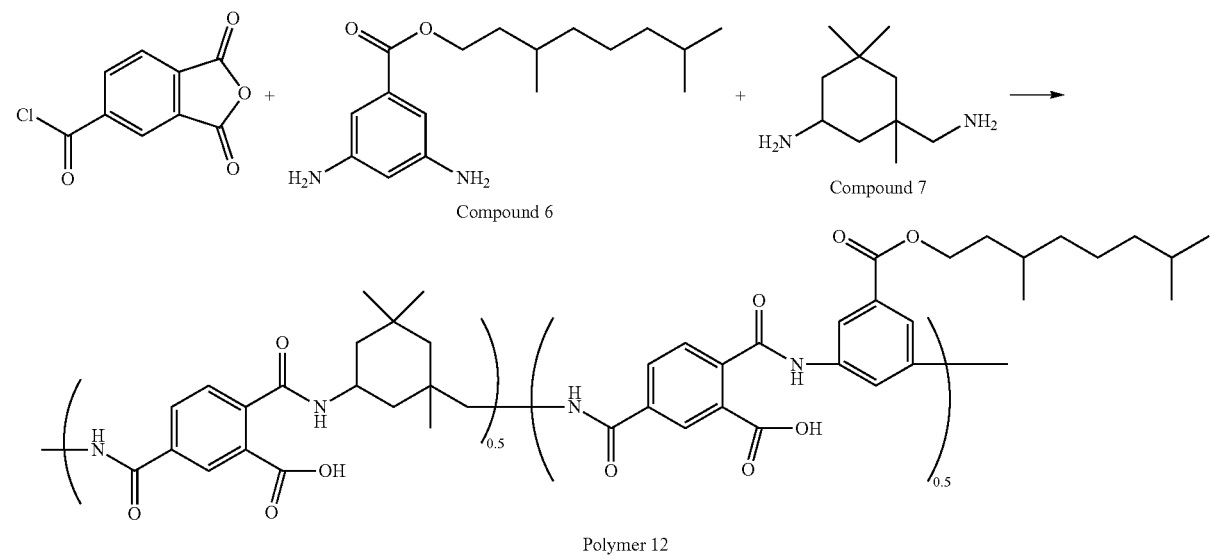

Polymer 12

[Synthesis of Polymer 13]

Polymer 13 was synthesized according to the following scheme. Polymer 13 was synthesized in the same manner as the Polymer 2 except that the Polymer 12 was heat treated at 260° C. The Polymer 13 was soluble in solvents such as NMP, DMF, DMA, DMSO, and the like.

[Chemical Formula 17]

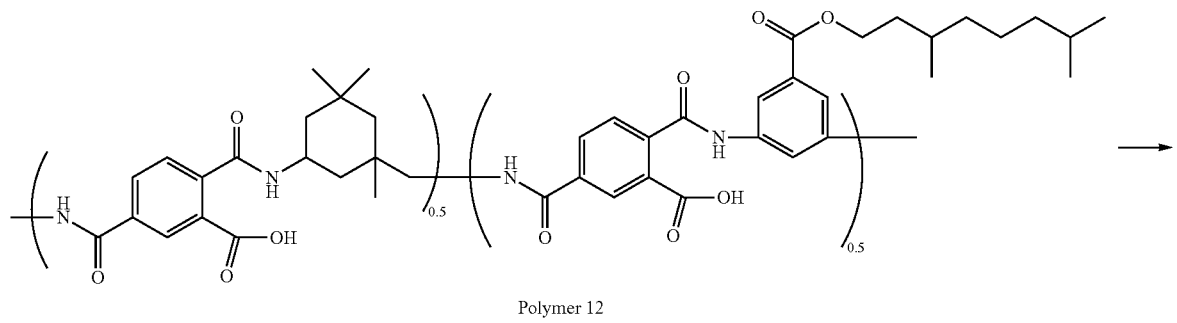

Polymer 12

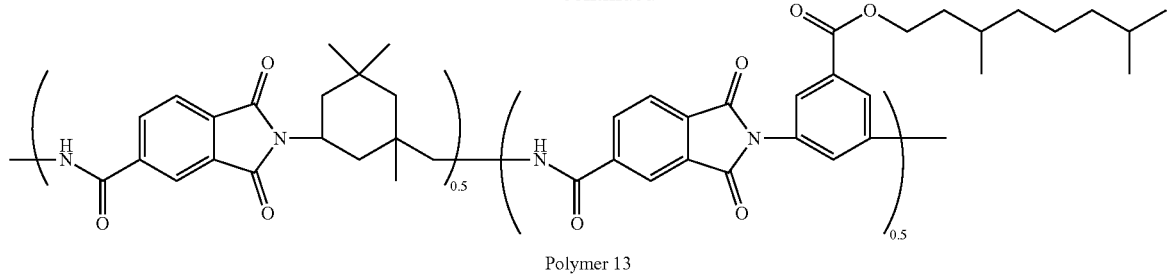

Polymer 13

[Synthesis of Polymer 14]

Polymer 14 was synthesized according to the following scheme. That is, Polymer 14 was synthesized in the same manner as the Polymer 6, except that the Compounds 6 and 8 were used instead of the Compounds 2 and 4.

[Chemical Formula 18]

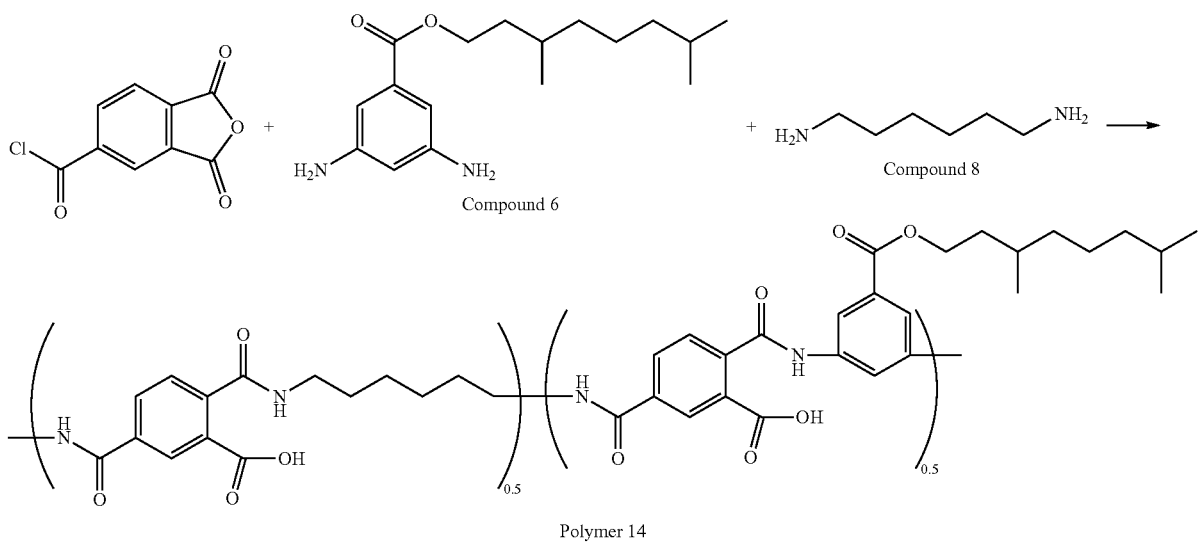

Polymer 14

[Synthesis of Polymer 15]

Polymer 15 was synthesized according to the following scheme. Thus, Polymer 15 was synthesized in the same manner as the Polymer 2 except that the Polymer 14 was used instead of the Polymer 1. The Polymer 15 was soluble in solvents such as NMP, DMF, DMA, DMSO, and the like.

[Chemical Formula 19]

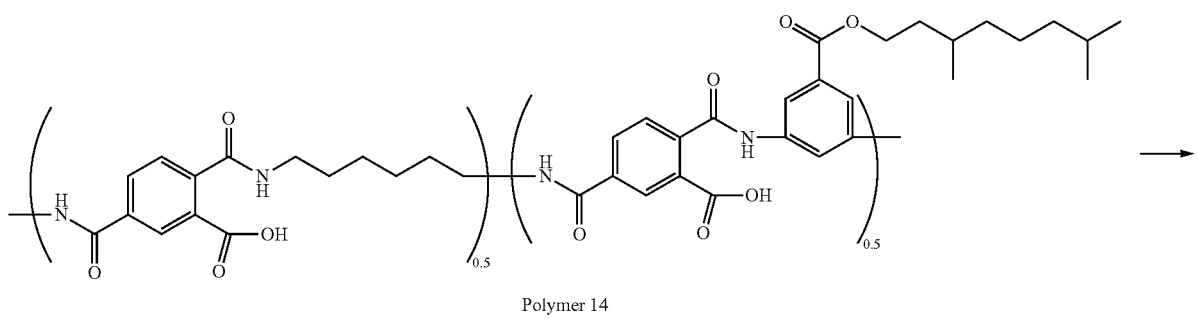

Polymer 14

-continued

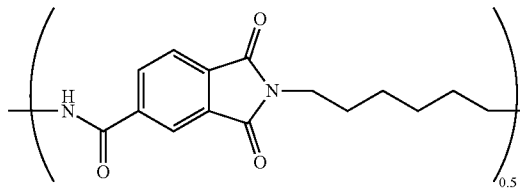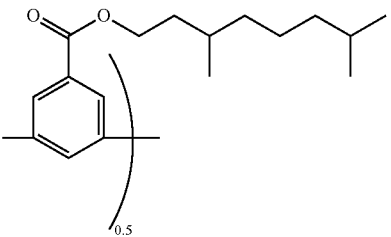

Polymer 15

Example 1

A liquid composition for forming a positive-electrode was prepared by adding ethyl lactate to a solid content consisting of the positive-electrode active material 1 (93.1% by mass), polyethylene glycol-based dispersant (0.9% by mass), carbon black (3% by mass), and the polymer 5 (3% by mass), so that the concentration of the solid content was adjusted to 35.8% by mass. The liquid composition for forming the positive-electrode had a viscosity of 15 mPa·s, a mode field diameter of 0.7 μm, and a $D_{90}$ of 3.1 μm.

Twenty-four hours after preparing the liquid composition for forming the positive-electrode, the particle size distribution of the liquid composition for forming the positive-electrode was recalculated. No change in the particle size distribution were observed, and the liquid composition for forming the positive-electrode had good storage stability.

The liquid composition for forming the positive-electrode was discharged to the aluminum foil as the positive-electrode substrate using the liquid discharge device EV2500 (manufactured by Ricoh Co., Ltd.) to form the positive-electrode. At this time, it is possible to continuously discharge the liquid composition to form the positive-electrode, and the liquid composition for forming the positive-electrode had good discharge stability, and discharge failure did not occur. That is, the liquid composition for forming the positive-electrode had good printing efficiency.

Example 2

A liquid composition for forming a positive-electrode was prepared in the same manner as the Example 1 except that the Polymer 7 was used instead of the Polymer 5. The liquid composition for forming the positive-electrode had a viscosity of 13 mPa·s, a mode field diameter of 0.7 μm, and a $D_{90}$ of 2.9 μm.

Twenty-four hours after preparing the liquid composition for forming the positive-electrode, the particle size distribution of the liquid composition for forming the positive-electrode was recalculated. A change in the particle size distribution was not observed, and the liquid composition for forming the positive-electrode had good storage stability.

The liquid composition for forming the positive-electrode was discharged to the aluminum foil as the positive-electrode substrate using the liquid discharge device EV2500 (manufactured by Ricoh Co., Ltd.) to form the positive-electrode. At this time, it is possible to continuously discharge the liquid composition for forming the positive-electrode, and the liquid composition for forming the positive-electrode had good discharge stability, and discharge failure did not occur. That is, the liquid composition for forming the positive-electrode had good printing efficiency.

Comparative Example 1

The preparation of a liquid composition used to form a positive-electrode using a method similar to that of the Example 1 using polyvinylidene fluoride (PVDF) was attempted, as PVDF is widely used as a binder for batteries. However, because the PVDF could not be dissolved, a liquid composition for forming a positive-electrode could not be produced.

Example 3

[Evaluation of Adhesion]

Figure 8:
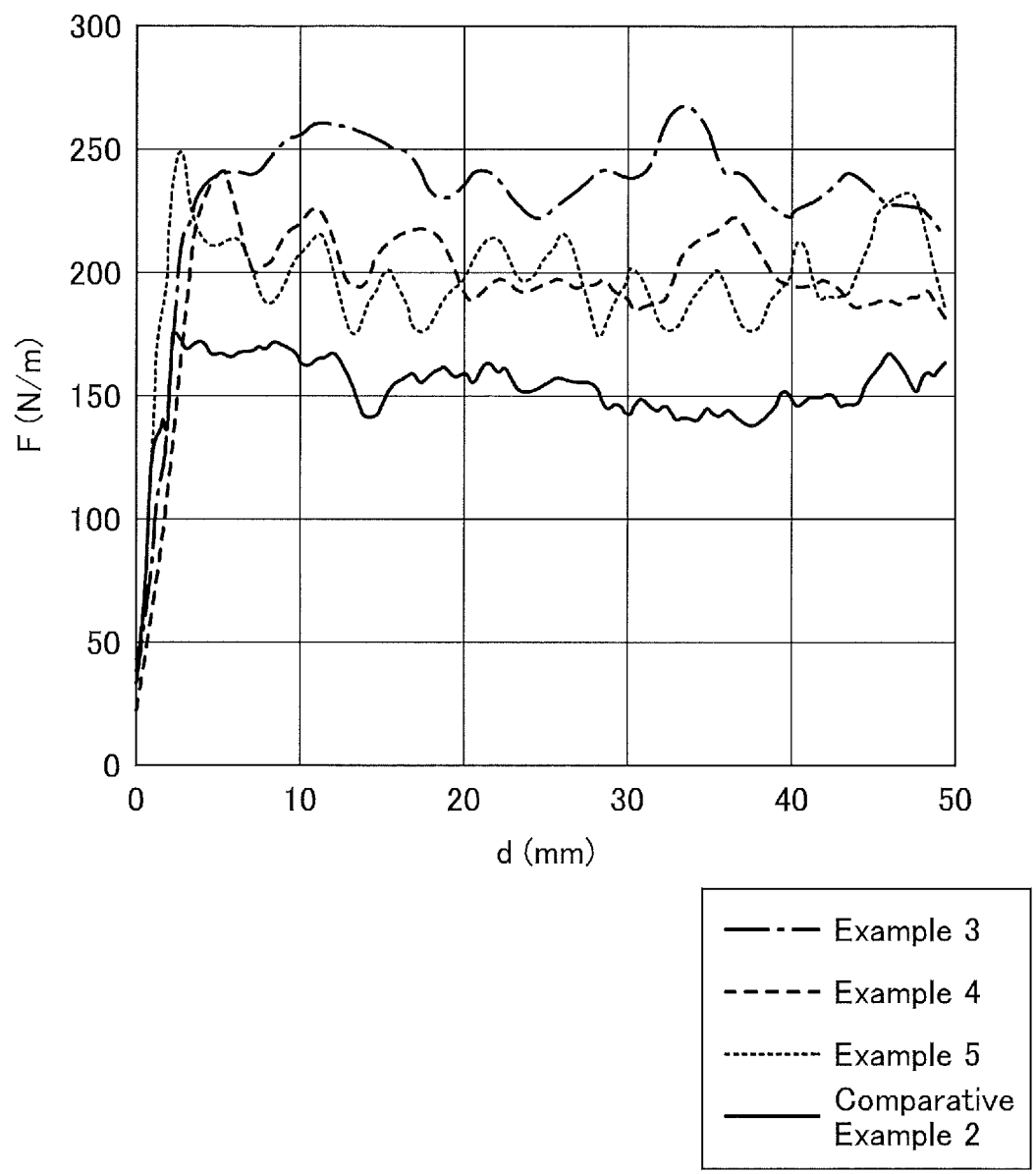
FIG. 8 is a figure illustrating the results of Examples 3 to 5 and Comparative Example 2.

A liquid composition for forming an electrochemical device was prepared by adding N-methylpyrrolidone to a solid mixture consisting of the positive-electrode active material 1 (93% by mass) and the polymer 2 (3% by mass), so that the concentration of the solid content was adjusted to 50% by mass. An aluminum foil was coated with the dispersed solution by a doctor blade at a gap of 100 μm and dried at 120° C. for 10 minutes. A peel strength test method was used to measure the peel strength of an electrode composite material layer by using an adhesive and coating peel analysis device VPA-3 (manufactured by Kyowa Interface Science Co., Ltd.). Specifically, an adhesive tape was applied to the side surface of the electrode composite material layer of the test piece cut in a size of 1.8 cm in width×10 cm in length, and then the adhesive tape was peeled off from one end of the test piece by 50 mm at a peel rate of 30 mm/min and a peel angle of 90° to measure the stress. The results are illustrated in FIG. 8.

Examples 4 and 5

The method in the same manner as in the Example 3 was used to evaluate the adhesiveness using the Polymer 5 and the Polymer 7. The results are illustrated in FIG. 8.

Comparative Example 2

The method in the same manner as in the Example 3 was used to evaluate the adhesiveness using polyvinylidene fluoride (PVDF), which is a widely used binder for batteries. The results are illustrated in FIG. 8.

The results in FIG. 8 illustrates that the peel strengths of the polymers used in Examples 3, 4 and 5 were superior to PVDF. That is, when an electrochemical device is prepared using a liquid composition for forming an electrochemical device of the present embodiment, an electrochemical device with excellent peel strength and high safety can be provided.

What is claimed is:

1. A liquid composition for forming an electrochemical device, comprising:
   one or both of an active material and an electrolyte;
   a dispersion medium; and
   a polymer,
   wherein the polymer contains constituent repeating units having an amide bond and an imide bond,
   wherein the polymer is a polyamideimide resin containing repeating units having a group represented by a following general formula (I), and
   wherein the constituent repeating units having the amide bond and the imide bond and the repeating units having the group represented by the following general formula (I) are bonded by an ester bond through an oxygen atom contained in the general formula (I):

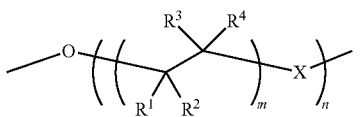

(I)

wherein X is an oxygen atom, wherein $R^1$, $R^2$, $R^3$, and $R^4$ are each independently hydrogen atoms, substituted or unsubstituted alkyl groups, and m and n are positive integers.

2. The liquid composition according to claim 1, comprising:
   the active material;
   the dispersion medium; and
   a polymer,
   wherein the polymer contains constituent repeating units having both an amide bond and an imide bond, and repeating units having a group represented by the following general formula (II):

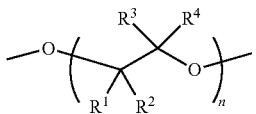

(II)

wherein, $R^1$, $R^2$, $R^3$, and $R^4$ are each independently hydrogen atoms, substituted or unsubstituted alkyl groups, and n is a positive integer.

3. The liquid composition according to claim 1, wherein the polymer is dissolved in the dispersion medium.

4. The liquid composition according to claim 1, comprising the active material and wherein the active material is present in the liquid composition in an amount of 10% by mass or more.

5. The liquid composition according to claim 1, comprising the active material and wherein the active material is one or more compounds selected from the group consisting of a lithium-containing transition metal compound, a lithium-containing transition metal phosphate compound, and carbon materials.

6. The liquid composition according to claim 5, further comprising:
   a conductive agent,
   wherein the lithium-containing transition metal phosphate compound is present and is composited with the conductive agent, and the conductive agent is the carbon materials.

7. The liquid composition according to claim 1, wherein a viscosity of the liquid composition at 25° C. is 200 mPa·s or less.

8. The liquid composition according to claim 1, wherein the active material is present and contains lithium, and the dispersion medium is a non-aqueous dispersion medium.

9. The liquid composition according to claim 1, wherein a viscosity of the liquid composition at 25° C. is 50 mPa·s or less.

10. The liquid composition according to claim 1, wherein the active material is present and the mass ratio of the polymer to the active material is 1 to 10%.

11. The liquid composition according to claim 1, wherein the repeating units of the polymer consist of the constituent repeating units having an amide bond and an imide bond and the repeating units having a group represented by the formula (I).

12. The liquid composition according to claim 2, wherein the repeating units of the polymer consist of the constituent repeating units having an amide bond and an imide bond and the repeating units having a group represented by the formula (I).

13. A method of manufacturing electrodes, comprising:
   coating the liquid composition for forming an electrochemical device of claim 1 onto an electrode substrate.

14. The method of manufacturing electrodes according to claim 13, comprising:
   discharging the liquid composition onto an electrode substrate.

15. The method of manufacturing electrodes according to claim 14, further comprising:
   applying pressure to the electrode substrate on which the liquid composition for forming an electrochemical device has been discharged.

16. A method of manufacturing an electrochemical device, comprising:
   manufacturing electrodes using the method of claim 13.

17. An electrode manufactured by the method of manufacturing an electrode of claim 13.

* * * * *